(12) United States Patent  
Nakata et al.

(10) Patent No.: US 10,371,407 B2
(45) Date of Patent: Aug. 6, 2019

(54) AIR CONDITIONING APPARATUS (71) Applicant: DAIKIN INDUSTRIES, LTD., Osaka-shi, Osaka (JP)

(72) Inventors: Takahiro Nakata, Osaka (JP); Junya Yoneda, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 0 days.

(21) Appl. No.: 15/771,653

(22) PCT Filed: Oct. 27, 2016

(86) PCT No.: PCT/JP2016/081933
§ 371 (c)(1),
(2) Date: Apr. 27, 2018

(87) PCT Pub. No.: WO2017/073688
PCT Pub. Date: May 4, 2017

(65) Prior Publication Data
US 2018/0320920 A1 Nov. 8, 2018

(30) Foreign Application Priority Data
Oct. 30, 2015 (JP) ................. 2015-215195

(51) Int. Cl.
F24F 11/74 (2018.01)
F25B 1/00 (2006.01)
(Continued)

(52) U.S. Cl.
CPC .............. F24F 11/74 (2018.01); F24F 11/77 (2018.01); F24F 11/89 (2018.01); F25B 1/00 (2013.01);
(Continued)

(58) Field of Classification Search
CPC .. F24F 11/30; F24F 11/74; F24F 11/77; F24F 11/89; F24F 2140/10; F24F 2140/12;
(Continued)

(56) References Cited

U.S. PATENT DOCUMENTS 5,592,059 A * 1/1997 Archer ................ F24F 11/0009
318/400.08

FOREIGN PATENT DOCUMENTS

JP  5-87391 A   4/1993
JP  5-240492 A  9/1993
(Continued)

OTHER PUBLICATIONS

International Search Report for PCT/JP2016/081933 (PCT/ISA/210) dated Dec. 20, 2016.

Primary Examiner — Marc E Norman
(74) Attorney, Agent, or Firm — Birch, Stewart, Kolasch & Birch, LLP (57) ABSTRACT An air conditioning apparatus is equipped with an indoor fan, an indoor heat exchanger, and a control unit. The indoor heat exchanger generates conditioned air by exchanging heat between refrigerant and room air. The control unit sets operating modes. The control unit controls the rotational speed of the indoor fan. More specifically, in a case where the operating mode has been switched from one to the other of a normal heating mode and a hot air mode in which the conditioned air higher in temperature than in the normal heating mode is generated, the control unit lowers the rotational speed at a second rate that is slower than a first rate which is a rate of decrease in the rotational speed in a case where the operating mode is set to the normal heating mode.

8 Claims, 4 Drawing Sheets (51) Int. Cl.
*F24F 11/89* (2018.01)
*F24F 11/77* (2018.01)
*F24F 11/30* (2018.01)
*F24F 140/10* (2018.01)
*F24F 140/12* (2018.01)

(52) U.S. Cl.
CPC ............ *F24F 11/30* (2018.01); *F24F 2140/10* (2018.01); *F24F 2140/12* (2018.01); *F24F 2221/34* (2013.01); *F25B 2500/07* (2013.01); *F25B 2600/027* (2013.01); *F25B 2700/193* (2013.01)

(58) Field of Classification Search
CPC ............ F25B 2500/07; F25B 2600/027; F25B 2700/193; F25B 2700/195; F25B 2700/2116
See application file for complete search history.

(56) References Cited

FOREIGN PATENT DOCUMENTS

| | | |
|---|---|---|
| JP | 2014-29224 A | 2/2014 |
| JP | 2014-153028 A | 8/2014 |

\* cited by examiner

AIR CONDITIONING APPARATUS

TECHNICAL FIELD

The present invention relates to an air conditioning apparatus.

BACKGROUND ART

An air conditioning apparatus is known which, at the start of a heating operation, sets high an upper limit air volume of a fan with respect to a heat exchanger temperature and which, when stable, sets low the upper limit air volume of the fan (see JP-A No. H5-87391).

SUMMARY OF INVENTION

Technical Problem

There are cases where this type of air conditioning apparatus has, as a heating function, a hot air mode that blows out hot air that is higher in temperature than in the typical heating mode. In a case where the operating mode has been switched from the hot air mode to the normal heating mode, there are cases where the rotational speed of the fan suddenly decreases. When the rotational speed of the fan suddenly decreases, the temperature of the condenser increases. At this time, when the temperature of the condenser increases too much, that is, when the refrigerant pressure increases too much, the compressor ends up stopping. It will be noted that the same problem can happen not only in a case where the operating mode has been switched from the hot air mode to the normal heating mode but also in a case where the operating mode has been switched from the normal heating mode to the hot air mode.

It is a problem of the present invention to provide an air conditioning apparatus that suppresses an excessive increase in refrigerant pressure.

Solution to Problem

An air conditioning apparatus pertaining to a first aspect of the present invention comprises an indoor fan, an indoor heat exchanger, a setting unit, and a control unit. The indoor heat exchanger generates conditioned air by exchanging heat between refrigerant and room air. The setting unit sets operating modes. The control unit controls the rotational speed of the indoor fan. In a case where the operating mode has been switched from one to the other of a first heating mode and a second heating mode in which the conditioned air higher in temperature than in the first heating mode is generated, the control unit lowers the rotational speed at a second rate that is slower than a first rate which is a rate of decrease in the rotational speed in a case where the operating mode is set to the first heating mode.

In the air conditioning apparatus pertaining to the first aspect of the present invention, in a case where the operating mode has been switched from one to the other of the first heating mode and the second heating mode, the control unit does not lower the rotational speed at the first rate but lowers the rotational speed at the second rate. Because of this, an excessive increase in the refrigerant temperature in the indoor heat exchanger can be suppressed.

In an air conditioning apparatus pertaining to a second aspect of the present invention, in a case where the operating mode has been switched from one to the other of the first heating mode and the second heating mode, the control unit lowers the rotational speed at the second rate if a value relating to refrigerant pressure is higher than a preset threshold value. The control unit lowers the rotational speed at the first rate if the value relating to the refrigerant pressure is equal to or less than the threshold value. That is, the control unit controls the rotational speed on the basis of the value relating to the refrigerant pressure.

Consequently, in the air conditioning apparatus pertaining to the second aspect of the present invention, the rotational speed can be lowered at a rate suited to the refrigerant pressure.

An air conditioning apparatus pertaining to a third aspect of the present invention further comprises a condenser and a temperature sensor. The temperature sensor detects the temperature of the condenser. The control unit lowers the rotational speed at the second rate if an output value of the temperature sensor serving as the value relating to the refrigerant pressure is higher than the threshold value.

In the air conditioning apparatus pertaining to the third aspect of the present invention, the control unit lowers the rotational speed at the second rate if the output value of the temperature sensor is higher than the threshold value, so the air conditioning apparatus does not need to be equipped with a pressure sensor.

An air conditioning apparatus pertaining to a fourth aspect of the present invention further comprises a compressor and a pressure sensor. The pressure sensor detects the refrigerant pressure on a discharge side of the compressor. The control unit lowers the rotational speed at the second rate if an output value of the pressure sensor serving as the value relating to the refrigerant pressure is higher than the threshold value.

In the air conditioning apparatus pertaining to the fourth aspect of the present invention, the control unit lowers the rotational speed at the second rate if the output value of the pressure sensor is higher than the threshold value. Because of this, the rotational speed of the indoor fan can be controlled with even higher precision.

In an air conditioning apparatus pertaining to a fifth aspect of the present invention, the control unit lowers the rotational speed to a target rotational speed at the second rate overall by alternating between intervals in which it maintains the rotational speed and intervals in which it lowers the rotational speed. That is, the control unit lowers the rotational speed to the target rotational speed at the second rate by lowering the rotational speed in stages.

In the air conditioning apparatus pertaining to the fifth aspect of the present invention, a simplification of control by a program can be expected.

Advantageous Effects of Invention

In the air conditioning apparatus pertaining to the first aspect of the present invention, an excessive increase in the refrigerant temperature in the indoor heat exchanger can be suppressed.

In the air conditioning apparatus pertaining to the second aspect of the present invention, the rotational speed can be lowered at a rate suited to the refrigerant pressure.

In the air conditioning apparatus pertaining to the third aspect of the present invention, the air conditioning apparatus does not need to be equipped with a pressure sensor.

In the air conditioning apparatus pertaining to the fourth aspect of the present invention, the rotational speed of the indoor fan can be controlled with even higher precision.

In the air conditioning apparatus pertaining to the fifth aspect of the present invention, a simplification of control by a program can be expected.

REFERENCE SIGNS LIST

100 Air conditioning apparatus
204 Compressor
301 Indoor Heat Exchanger
302 Indoor Fan
310 Control Unit

DESCRIPTION OF EMBODIMENT

An embodiment of the invention will be described below. It will be noted that the following embodiment is merely a specific example and is not intended to limit the invention pertaining to the claims.

First Embodiment (1) Configuration of Air Conditioning Apparatus

Figure 1:
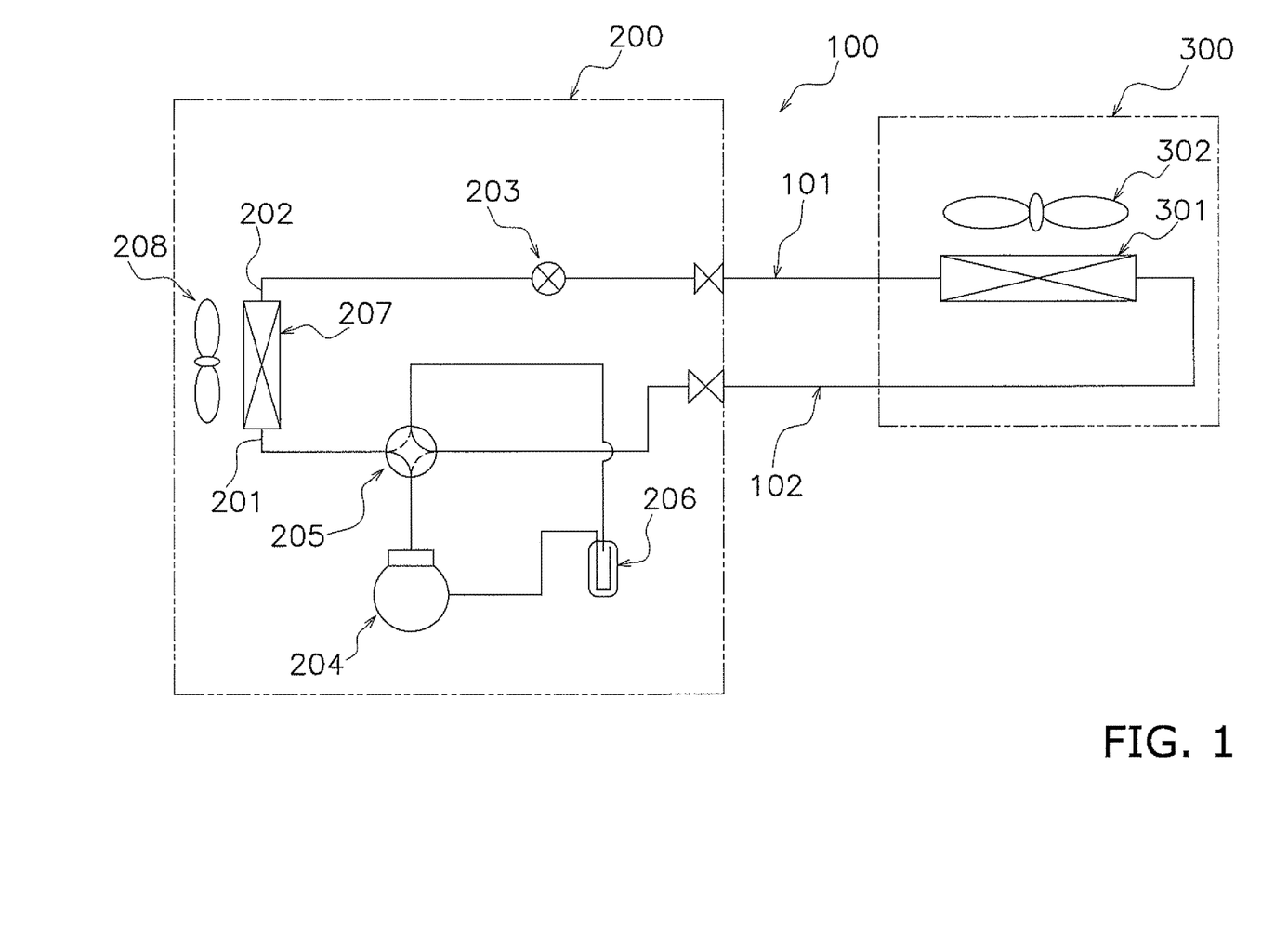
FIG. 1 is a drawing describing an example of the configuration of an air conditioning apparatus.

FIG. 1 is a drawing describing an example of the configuration of an air conditioning apparatus 100. The air conditioning apparatus 100 includes an air conditioning outdoor unit 200 serving as a heat source-side unit and an air conditioning indoor unit 300 serving as a utilization-side unit. The air conditioning outdoor unit 200 and the air conditioning indoor unit 300 are connected to each other via a refrigerant communication pipe 101 for liquid refrigerant and a refrigerant communication pipe 102 for gas refrigerant.

A refrigerant circuit of the air conditioning apparatus 100 is configured by the air conditioning outdoor unit 200, the air conditioning indoor unit 300, the refrigerant communication pipe 101, and the refrigerant communication pipe 102. More specifically, the refrigerant circuit includes an expansion valve 203, a compressor 204, a four-port switching valve 205, an accumulator 206, an outdoor heat exchanger 207, and an indoor heat exchanger 301.

(2) Detailed Configuration of Air Conditioning Apparatus (2-1) Air Conditioning Indoor Unit The air conditioning indoor unit 300 has the indoor heat exchanger 301 and an indoor fan 302. The indoor heat exchanger 301 is, for example, a cross-fin type fin-and-tube heat exchanger configured by heat transfer tubes and numerous fins. The indoor heat exchanger 301 functions as an evaporator of the refrigerant in a cooling operation to cool room air and functions as a condenser of the refrigerant in a heating operation to heat room air. That is, the indoor heat exchanger 301 generates conditioned air by exchanging heat between the refrigerant and the room air. The generated conditioned air is blown out from an air outlet (not shown in the drawings) in the air conditioning indoor unit 300. The indoor fan 302 is connected to a fan motor 330 (see FIG. 2). When the indoor fan 302 rotates because of the driving of the fan motor 330, the air in the room is supplied to the indoor heat exchanger 301.

(2-2) Air Conditioning Outdoor Unit

The air conditioning outdoor unit 200 has a gas refrigerant pipe 201, a liquid refrigerant pipe 202, the expansion valve 203, the compressor 204, the four-port switching valve 205, the accumulator 206, the outdoor heat exchanger 207, and an outdoor fan 208. One end of the gas refrigerant pipe 201 is connected to a gas-side end portion of the outdoor heat exchanger 207, and the other end of the gas refrigerant pipe 201 is connected to the four-port switching valve 205. One end of the liquid refrigerant pipe 202 is connected to a liquid-side end portion of the outdoor heat exchanger 207, and the other end of the liquid refrigerant pipe 202 is connected to the expansion valve 203.

The expansion valve 203 is a mechanism that reduces the pressure of the refrigerant. The expansion valve 203 is provided between the outdoor heat exchanger 207 and the refrigerant communication pipe 101. The compressor 204 is a closed compressor driven by a compressor motor.

The four-port switching valve 205 is a mechanism that switches the direction in which the refrigerant flows. In the cooling operation, as indicated by the solid lines of the four-port switching valve 205 in FIG. 1, the four-port switching valve 205 interconnects a refrigerant pipe on the discharge side of the compressor 204 and the gas refrigerant pipe 201 and interconnects, via the accumulator 206, a refrigerant pipe on the intake side of the compressor 204 and the refrigerant communication pipe 102. On the other hand, in the heating operation, as indicated by the dashed lines of the four-port switching valve 205 in FIG. 1, the four-port switching valve 205 interconnects the refrigerant pipe on the discharge side of the compressor 204 and the refrigerant communication pipe 102 and interconnects, via the accumulator 206, the refrigerant pipe on the intake side of the compressor 204 and the gas refrigerant pipe 201.

The accumulator 206 separates the refrigerant into its gas phase and its liquid phase. The accumulator 206 is provided between the compressor 204 and the four-port switching valve 205.

The outdoor heat exchanger 207 functions as a condenser of the refrigerant in the cooling operation and functions as an evaporator of the refrigerant in the heating operation. The outdoor fan 208 supplies air to the outdoor heat exchanger 207.

(3) Air Conditioning Actions of Air Conditioning Apparatus (3-1) Cooling Operation The opening degree of the expansion valve 203 is adjusted in such a way that the degree of superheating of the refrigerant at the outlet of the indoor heat exchanger 301 (that is, the gas side of the indoor heat exchanger 301) becomes constant. The state of connection of the four-port switching valve 205 in the cooling operation is as has already been described.

In the refrigerant circuit in the state described above, the refrigerant that has been discharged from the compressor 204 travels through the four-port switching valve 205, flows into the outdoor heat exchanger 207, radiates heat to the outdoor air, and condenses. The refrigerant that has flowed out from the outdoor heat exchanger 207 expands when it travels through the expansion valve 203. Thereafter, the refrigerant flows into the indoor heat exchanger 301, absorbs heat from the room air, and evaporates.

(3-2) Heating Operation

The opening degree of the expansion valve 203 is adjusted in such a way that the degree of subcooling of the refrigerant at the outlet of the indoor heat exchanger 301 becomes constant at a degree of subcooling target value. The state of connection of the four-port switching valve 205 in the heating operation is as has already been described.

In the refrigerant circuit in the state described above, the refrigerant that has been discharged from the compressor 204 travels through the four-port switching valve 205, flows into the indoor heat exchanger 301, radiates heat to the room air, and condenses. The refrigerant that has flowed out from the indoor heat exchanger 301 expands when it travels through the expansion valve 203. Thereafter, the refrigerant flows into the outdoor heat exchanger 207, absorbs heat from the outdoor air, and evaporates. The refrigerant that has flowed out from the outdoor heat exchanger 207 travels through the four-port switching valve 205 and thereafter is sucked back into the compressor 204 and compressed.

(4) Functional Blocks of Air Conditioning Indoor Unit

Figure 2:
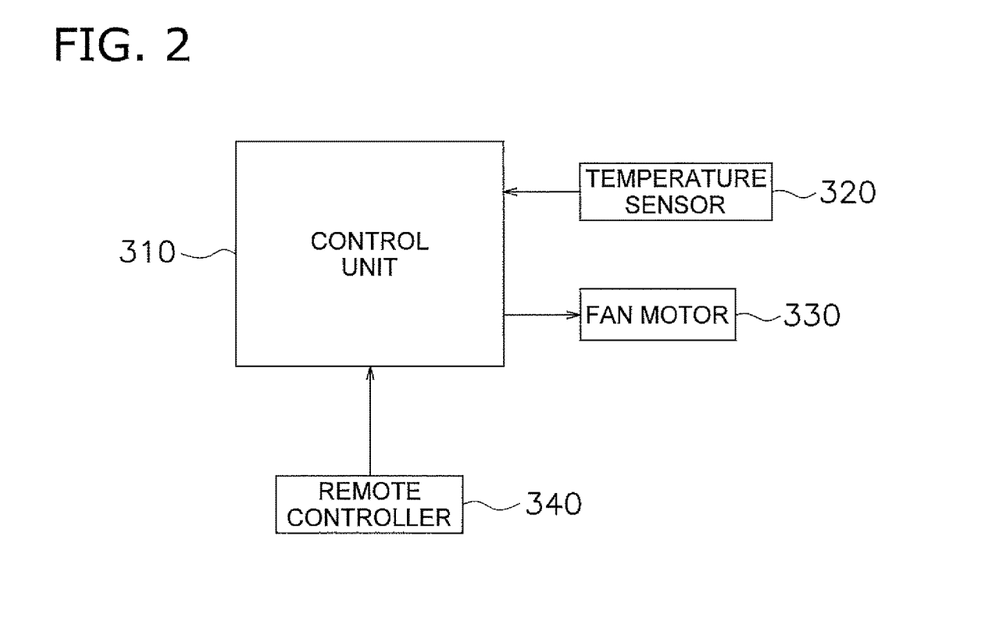
FIG. 2 is a drawing describing an example of functional blocks of an air conditioning indoor unit.

FIG. 2 is a drawing describing an example of functional blocks of the air conditioning indoor unit 300. The air conditioning indoor unit 300 includes a control unit 310, a temperature sensor 320, and a remote controller 340 in addition to the fan motor 330.

The control unit 310 is a computer configured from an MPU, a ROM, and a RAM. Various types of threshold values used in a later-described flowchart, and a later-described lower limit rotational speed, are stored beforehand in the ROM. The control unit 310 is electrically connected to the temperature sensor 320 and the fan motor 330.

The control unit 310 fulfills a role as a setting unit that sets operating modes on the basis of a later-described command signal. The operating modes include a normal heating mode serving as an example of a first heating mode and a hot air mode serving as an example of a second heating mode. That is, the air conditioning apparatus 100 has, as heating functions, a normal heating mode and a hot air mode. The outgoing air temperature in the hot air mode is higher than the outgoing air temperature in the normal heating mode. That is, in the hot air mode, conditioned air higher in temperature than in the normal heating mode is generated. The operating modes further include a fan mode and a cooling mode.

The control unit 310 acquires an output value of the temperature sensor 320 from the temperature sensor 320. The control unit 310 controls the rotational speed of the indoor fan 302 on the basis of the acquired output value. That is, the control unit 310 controls the fan motor 330. Although details will be described later, in a case where the operating mode has been switched from the hot air mode to the normal heating mode, the control unit 310 sets a lower limit value of the rotational speed if the acquired output value is larger than a preset threshold value. Because of this, the control unit 310 decreases the rotational speed of the indoor fan 302 in stages.

The temperature sensor 320 detects the indoor heat exchanger temperature serving as an example of a value relating to refrigerant pressure. The indoor heat exchanger temperature is the temperature in the two-phase region of the indoor heat exchanger 301. The temperature sensor 320 sends the detected indoor heat exchanger temperature to the control unit 310.

The remote controller 340 sends command signals to the control unit 310 by infrared on the basis of user operations. The command signals include a command signal relating to the setting of the operating mode. The user can set the operating mode of the air conditioning indoor unit 300 by operating the remote controller 340.

(5) Switching Between Normal Heating Mode and Hot Air Mode

Figure 3:
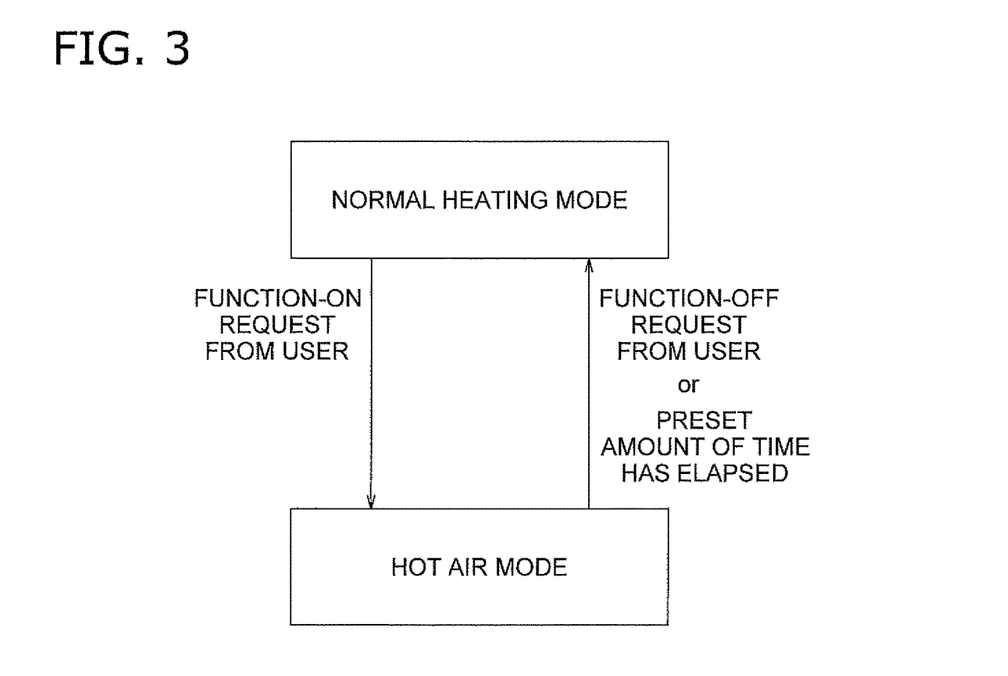
FIG. 3 is a drawing describing switching between a normal heating mode and a hot air mode.

FIG. 3 is a drawing describing switching between the normal heating mode and the hot air mode. As has already been described, the air conditioning apparatus 100 has, as heating functions, the normal heating mode and the hot air mode. In a case where the operating mode is set to the normal heating mode, the air conditioning indoor unit 300 switches from the normal heating mode to the hot air mode if there is a request from the user to switch on the function of the hot air mode.

On the other hand, in a case where the operating mode is set to the hot air mode, the air conditioning indoor unit 300 switches from the hot air mode to the normal heating mode if there is a request from the user to switch off the function of the hot air mode. Furthermore, the air conditioning indoor unit 300 switches from the hot air mode to the normal heating mode also in a case where a preset amount of time has elapsed since the operating mode was set to the hot air mode.

(6) Rates of Decrease in Rotational Speed of Indoor Fan

Figure 4:
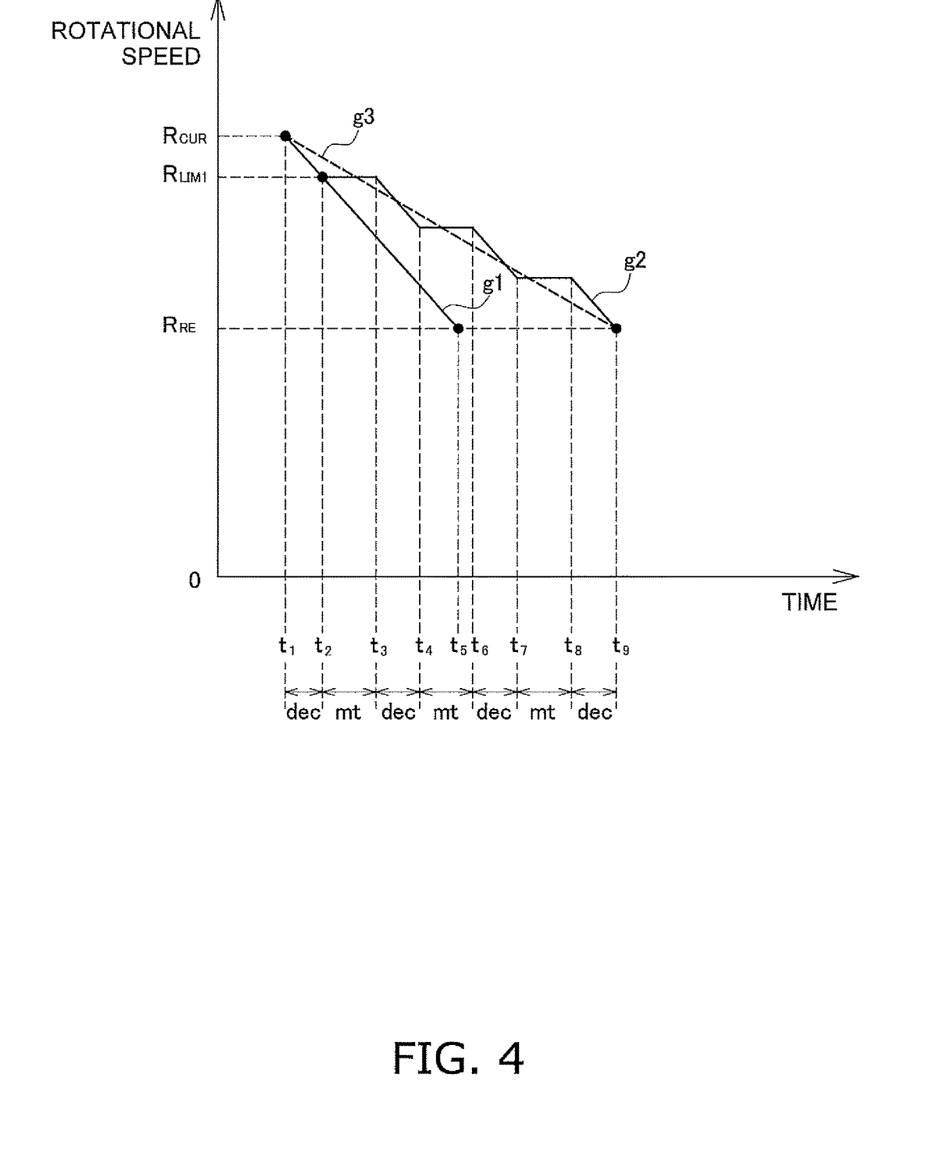
FIG. 4 is a drawing describing rates of decrease in the rotational speed of an indoor fan.

FIG. 4 is a drawing describing rates of decrease in the rotational speed of the indoor fan 302. The horizontal axis represents time and the vertical axis represents the rotational speed of the indoor fan 302.

In graph g1, the rotational speed of the indoor fan 302 decreases linearly downward to the right from a current rotational speed $R_{CUR}$ to a target rotational speed $R_{RE}$. That is, the rotational speed of the indoor fan 302 monotonically decreases as a linear function. In graph g1, a period of time t5-time t1 is needed until the rotational speed of the indoor fan 302 decreases from the current rotational speed $R_{CUR}$ to the target rotational speed $R_{RE}$. That is, the rate of decrease in the rotational speed serving as a first rate is $(R_{CUR}-R_{RE})/(t5-t1)$. In a case where the operating mode is set to the normal heating mode, the rotational speed of the indoor fan 302 is lowered at the first rate as shown in graph g1.

In graph g2, the rotational speed of the indoor fan 302 does not monotonically decrease as a linear function but decreases from the current rotational speed $R_{CUR}$ to the target rotational speed $R_{RE}$ while alternating between decrease intervals dec and maintain intervals mt. That is, the rotational speed of the indoor fan 302 decreases in stages. Although details will be described later, by appropriately setting a lower limit value of the rotational speed, that is, by providing the maintain intervals mt, a situation where the rotational speed monotonically decreases as a linear function is avoided. The decrease intervals dec are intervals in which the rotational speed of the indoor fan 302 decreases, and the maintain intervals mt are intervals in which the rotational speed of the indoor fan 302 is maintained.

In the present embodiment, the rotational speed of the indoor fan 302 first decreases from the current rotational speed $R_{CUR}$ to a first lower limit rotational speed $R_{LIM1}$ from time t1 to time t2. The first lower limit rotational speed $R_{LIM1}$ is a rotational speed at a particular fan tap. The first lower limit rotational speed $R_{LIM1}$ is preset as a sufficiently allowed rotational speed from the standpoint of avoiding stopping of the compressor 204. Thereafter, the rotational speed of the indoor fan 302 alternates between the maintain intervals mt and the decrease intervals dec. More specifically, the intervals of the rotational speed of the indoor fan 302 are a maintain interval mt from time t2 to time t3 and a decrease interval dec from time t3 to time t4. From time t4 to time t6 is a maintain interval mt, and from time t6 to time t7 is a decrease interval dec. From time t7 to time t8 is a maintain interval mt, and from time t8 to time t9 is a decrease interval dec.

In each decrease interval dec in the alternating intervals, the rotational speed of the indoor fan 302 decreases a second lower limit rotational speed at a time. It will be noted that, in FIG. 4, the drop from the current rotational speed $R_{CUR}$ to the first lower limit rotational speed is smaller than the drop at each decrease interval dec in the alternating intervals.

In graph g2, a period of time t9–time t1 is needed until the rotational speed of the indoor fan 302 decreases from the current rotational speed $R_{CUR}$ to the target rotational speed $R_{RE}$. That is, as shown in graph g3, the overall rate of decrease in the rotational speed serving as a second rate is $(R_{CUR}-R_{RE})/(t9-t1)$.

As will be understood from graph g1 and graph g3, the second rate is slower than the first rate. Furthermore, the rate in each decrease interval dec in graph g2 is the same as the first rate.

(7) Flowchart

Figure 5:
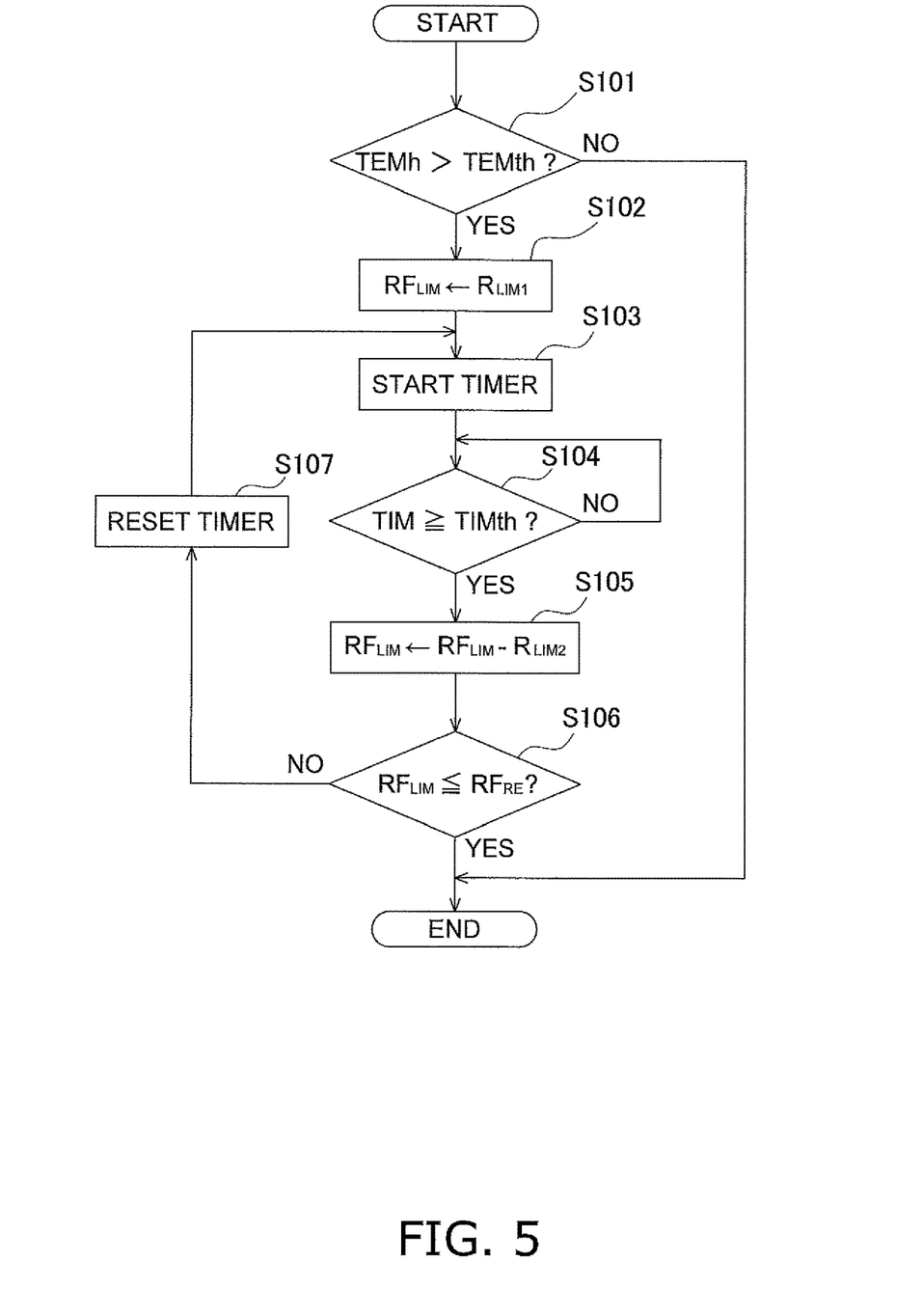
FIG. 5 is a drawing showing an example of a flowchart of processing for setting a lower limit value of the rotational speed of the indoor fan.

FIG. 5 is a drawing showing an example of a flowchart of processing for setting the lower limit value of the rotational speed of the indoor fan 302. The flowchart is started in a case where the operating mode has been switched from the hot air mode to the normal heating mode. In the flowchart, variable TEMh represents the indoor heat exchanger temperature. Constant TEMth represents the threshold value of the indoor heat exchanger temperature. Variable $RF_{LIM}$ represents the lower limit value of the rotational speed of the indoor fan 302. Constant $RF_{LIM1}$ represents the first lower limit rotational speed. Constant $RF_{LIM2}$ represents the second lower limit rotational speed. Constant $RF_{RE}$ represents the target rotational speed. The target rotational speed is, for example, the rotational speed in the normal heating mode just before the operating mode is switched to the hot air mode. Variable TIM represents a count value of a timer. Constant TIMth represents a threshold value of the timer.

When the operating mode is switched from the hot air mode to the normal heating mode, the control unit 310 determines whether variable TEMh is greater than constant TEMth (step S101). That is, the control unit 310 determines whether the indoor heat exchanger temperature is greater than the preset threshold value.

In a case where the control unit 310 has determined that variable TEMh is greater than constant TEMth (YES in step S101), the control unit 310 assigns constant $RF_{LIM1}$ to variable $RF_{LIM}$ (step S102). That is, the control unit 310 sets the lower limit value of the rotational speed of the indoor fan 302 to the first lower limit rotational speed. Thereafter, the control unit 310 lowers the lower limit value of the rotational speed of the indoor fan 302 every certain amount of time. That is, the control unit 310 lowers the lower limit value of the rotational speed of the indoor fan 302 in stages. Because of this, the control unit 310 lowers the rotational speed at the second rate that is slower than the first rate. Specifically, the control unit 310 accomplishes this as follows.

First, the control unit 310 starts the timer (step S103). Next, the control unit 310 determines whether or not variable TIM is equal to or greater than constant TIMth (step S104). In a case where the control unit 310 has determined that variable TIM is less than constant TIMth (NO in step S104), the control unit 310 stands by. On the other hand, in a case where the control unit 310 has determined that variable TIM is equal to or greater than constant TIMth (YES in step S104), the control unit 310 assigns to variable $RF_{LIM}$ a new value obtained by subtracting constant $RF_{LIM2}$ from variable $RF_{LIM}$ (step S105). That is, the control unit 310 lowers the lower limit value of the rotational speed of the indoor fan 302 by constant $RF_{LIM2}$.

The control unit 310 determines whether or not variable $RF_{LIM}$ is equal to or less than constant $RF_{RE}$ (step S106). That is, the control unit 310 determines whether or not the lower limit value of the rotational speed of the indoor fan 302 has reached the target rotational speed. In a case where variable $RF_{LIM}$ is greater than constant $RF_{RE}$ (NO in step S106), the control unit 310 resets the timer (step S107) and returns to step S103. In a case where the control unit 310 has determined that variable $RF_{LIM}$ is equal to or less than constant $RF_{RE}$, the control unit 310 ends the series of processes. Furthermore, also in a case where the control unit 310 has determined in step S101 that variable TEMh is equal to or less than constant TEMth (NO in step S101), the control unit 310 ends the series of processes without performing the lower limit value setting processing. In this case, it suffices to decrease the rotational speed of the indoor fan 302 at the first rate.

(8) Characteristics of Air Conditioning Apparatus

In the air conditioning apparatus 100 of the present embodiment, in a case where the operating mode has been switched from the hot air mode to the normal heating mode, the control unit 310 does not lower the rotational speed at the first rate but lowers the rotational speed at the second rate that is slower than the first rate. Because of this, an excessive increase in the refrigerant temperature in the indoor heat exchanger 301 can be suppressed.

In the air conditioning apparatus 100 of the present embodiment, in a case where the operating mode has been switched from the hot air mode to the normal heating mode, the control unit 310 controls the rotational speed on the basis of the indoor heat exchanger temperature. Specifically, first, the control unit 310 determines whether or not the indoor heat exchanger temperature is greater than the preset threshold value. Then, in a case where the indoor heat exchanger temperature is greater than the preset threshold value, the control unit 310 lowers the rotational speed at the second rate. In a case where the indoor heat exchanger temperature is equal to or less than the preset threshold value, the control unit 310 lowers the rotational speed at the first rate. The control unit 310 controls the rotational speed on the basis of the indoor heat exchanger temperature, so the rotational speed can be lowered at a rate suited to the refrigerant pressure.

In the air conditioning apparatus 100 of the present embodiment, the control unit 310 lowers the rotational speed at the second rate if the output value of the temperature sensor 320 serving as the indoor heat exchanger temperature is higher than the threshold value. Consequently, the air conditioning apparatus 100 does not need to be equipped with a pressure sensor.

In the air conditioning apparatus 100 of the present embodiment, the control unit 310 lowers the rotational speed to the target rotational speed at the second rate overall by alternating between intervals in which it maintains the rotational speed and intervals in which it lowers the rotational speed. Because of this, a simplification of control by a program can be expected.

Example Modifications

Example modifications applicable to the embodiment of the present invention will be described.

(1) Example Modification A

In the above description, the air conditioning apparatus 100 was equipped with the temperature sensor 320, but the air conditioning apparatus 100 may also be equipped with a pressure sensor instead of the temperature sensor 320 or in addition to the temperature sensor 320. The pressure sensor detects the refrigerant pressure on the discharge side of the compressor 204. The control unit 310 acquires an output value of the pressure sensor. Additionally, the control unit 310 controls the fan motor 330 in accordance with the acquired output value.

In a case where the operating mode has been switched from the hot air mode to the normal heating mode, the control unit 310 may also set the lower limit value of the rotational speed if the acquired output value is greater than a preset threshold value. Because of this, the rotational speed of the indoor fan 302 can be decreased in stages, so the rotational speed of the indoor fan 302 can be decreased at the second rate. In this case, for example, the flowchart described in FIG. 5 can be applied. In a case where the control unit 310 controls the fan motor 330 in accordance with the output value of the pressure sensor, the rotational speed of the indoor fan 302 can be controlled with even higher precision.

(2) Example Modification B

In the above description, the control unit 310 determined whether or not it was necessary to set the lower limit value of the rotational speed in accordance with the refrigerant pressure itself or the indoor heat exchanger temperature correlated with the refrigerant pressure, but the control unit 310 may also determine whether or not it is necessary to set the lower limit value of the rotational speed in accordance with other factors. For example, in a case where the operating mode has been switched from the hot air mode to the normal heating mode, if the air volume of the indoor fan 302 in the normal heating mode just before is lower than the air volume of the indoor fan 302 in the hot air mode, the control unit 310, by switching the operating mode, decreases the air volume of the indoor fan 302 and returns to the set value just before. At this time, there can be cases where the refrigerant pressure increases excessively.

Thus, the control unit 310 may determine whether or not it is necessary to set the lower limit value of the rotational speed of the indoor fan 302 on the basis of the air volume of the indoor fan 302. More specifically, if the air volume of the indoor fan 302 in the normal heating mode just before is lower than the air volume of the indoor fan 302 in the hot air mode, it is best for the control unit 310 to lower the rotational speed of the indoor fan 302 in stages.

(3) Example Modification C

In the above description, the rate in each decrease interval dec in the graph g2 of FIG. 4 was the same as the first rate, but it does not need to be the same as the first rate. For example, the rate may also be slower than the first rate. Because of this, an excessive increase in the refrigerant temperature in the indoor heat exchanger 301 can be suppressed even more.

(4) Example Modification D

In the above description, the control unit 310 lowered the rotational speed of the indoor fan 302 at the second rate by lowering the rotational speed of the indoor fan 302 in stages, but the control unit 310 does not need to lower the rotational speed in stages. For example, as indicated by graph g3 in FIG. 4, the control unit 310 may also monotonically decrease the rotational speed of the indoor fan 302 as a linear function.

(5) Example Modification E

The drop from the current rotational speed $R_{CUR}$ to the first lower limit rotational speed may also be appropriately set in accordance with the current rotational speed $R_{CUR}$. Furthermore, the drop from the current rotational speed $R_{CUR}$ to the first lower limit rotational speed may also be the same as the drop at each decrease interval dec in the alternating intervals, or may also be larger than the drop at each decrease interval dec in the alternating intervals.

(6) Example Modification F

In the above description, a case where the operating mode was switched from the hot air mode to the normal heating mode was given as an example, but the control unit 310 may lower the rotational speed of the indoor fan 302 at the second rate also in a case where the operating mode has been switched from the normal heating mode to the hot air mode. In this case also, the flowchart shown in FIG. 5 can be applied. That is, the flowchart shown in FIG. 5 can be applied to a case where the operating mode has been switched from one to the other of the hot air mode and the normal heating mode.

(7) Example Modification G

In FIG. 5, the control unit 310 ended the series of processes in a case where the control unit 310 determined that variable $RF_{LIM}$ is equal to or less than constant $RF_{RE}$ (YES in step S106) or determined in step S101 that variable TEMh is equal to or less than constant TEMth. However, the control unit 310 may also, even if these conditions are not met, end the series of processes in a case where the compressor 204 has stopped. For example, the compressor 204 stops in a case where the operating mode has been switched to the fan mode or the cooling mode. Consequently, the control unit 310 may also end the series of processes in a case where the operating mode has been switched to the fan mode or the cooling mode. That is, the control unit 310 may also cancel the setting of the lower limit value.

The invention has been described above using an embodiment, but the technical scope of the invention is not limited to the scope described in the embodiment. It will be apparent to those skilled in the art that many changes or improvements can also be added to the embodiment. It will be apparent from the claims that embodiments to which such changes or improvements have been added can also be included in the technical scope of the invention.

It should be noted that the execution order of processes such as operations, procedures, steps, and stages in a device, program, and method described in the claims, specification, and drawings can be realized in an arbitrary order unless expressions such as "before" and "preceding" are clearly indicated or in a case where the output of a previous process is used in a subsequent process. Even if an operational flow in the claims, specification, and drawings is described using expressions such as "first" and "next" for the sake of convenience, this does not mean that the operational flow must be implemented in this order.

The invention claimed is:

1. An air conditioning apparatus comprising:
an indoor fan;
an indoor heat exchanger that generates conditioned air by exchanging heat between refrigerant and room air; and
a controller that sets operating modes and controls a rotational speed of the indoor fan,
wherein in a case where the operating mode has been switched from one to the other of a first heating mode and a second heating mode in which the conditioned air higher in temperature than in the first heating mode is generated, the controller lowers the rotational speed at a second rate that is slower than a first rate which is a rate of decrease in the rotational speed in a case where the operating mode is set to the first heating mode.

2. The air conditioning apparatus according to claim 1, wherein in a case where the operating mode has been switched from one to the other of the first heating mode and the second heating mode, the controller lowers the rotational speed at the second rate if a value relating to refrigerant pressure is higher than a preset threshold value and lowers the rotational speed at the first rate if the value is equal to or less than the threshold value.

3. The air conditioning apparatus according to claim 2, further comprising
a condenser and
a temperature sensor that detects the temperature of the condenser, wherein
the controller lowers the rotational speed at the second rate if an output value of the temperature sensor serving as the value is higher than the threshold value.

4. The air conditioning apparatus according to claim 2, further comprising
a compressor and
a pressure sensor that detects the refrigerant pressure on a discharge side of the compressor, wherein
the controller lowers the rotational speed at the second rate if an output value of the pressure sensor serving as the value is higher than the threshold value.

5. The air conditioning apparatus according to claim 2, wherein the controller lowers the rotational speed to a target rotational speed at the second rate overall by alternating between intervals in which it maintains the rotational speed and intervals in which it lowers the rotational speed.

6. The air conditioning apparatus according to claim 3, wherein the controller lowers the rotational speed to a target rotational speed at the second rate overall by alternating between intervals in which it maintains the rotational speed and intervals in which it lowers the rotational speed.

7. The air conditioning apparatus according to claim 4, wherein the controller lowers the rotational speed to a target rotational speed at the second rate overall by alternating between intervals in which it maintains the rotational speed and intervals in which it lowers the rotational speed.

8. The air conditioning apparatus according to claim 1, wherein the controller lowers the rotational speed to a target rotational speed at the second rate overall by alternating between intervals in which it maintains the rotational speed and intervals in which it lowers the rotational speed.

* * * * *